Figure 1:
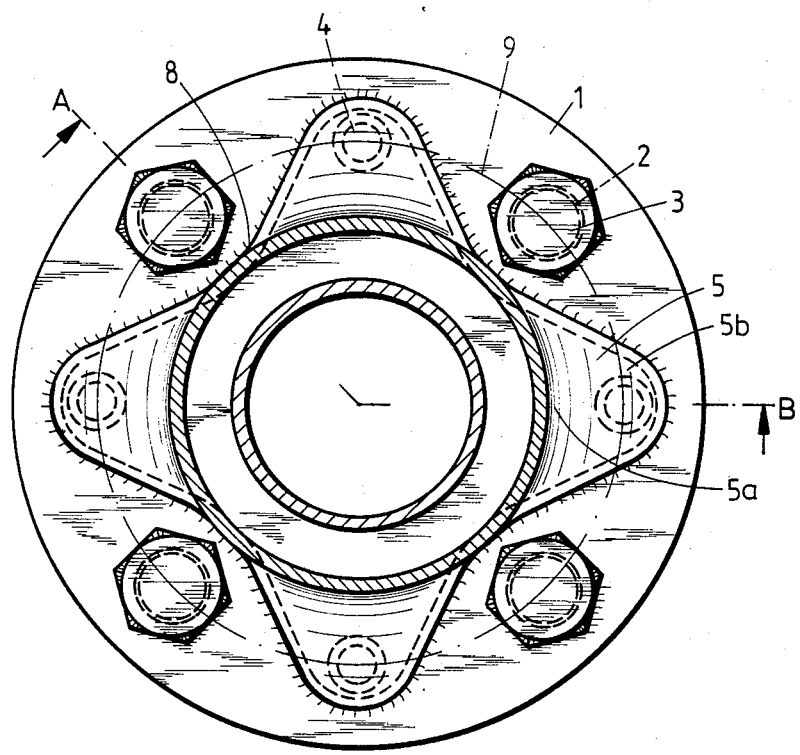

United States Patent [19]

Schulz

[11] Patent Number: 4,521,039
[45] Date of Patent: Jun. 4, 1985

[54] CONNECTOR FOR HEATED PIPES

[76] Inventor: Wilhelm Schulz, Kuhleshütte 85, 4150 Krefeld, Fed. Rep. of Germany

[21] Appl. No.: 463,510

[22] Filed: Feb. 3, 1983

[30] Foreign Application Priority Data

Feb. 10, 1982 [DE] Fed. Rep. of Germany ....... 3204561
Mar. 6, 1982 [DE] Fed. Rep. of Germany ....... 3208106

[51] Int. Cl.³ ............................................ F16L 53/00
[52] U.S. Cl. .................................. 285/41; 285/133 R; 285/363
[58] Field of Search ...................... 285/41, 176, 133 R, 285/138, 363, 416

[56] References Cited

U.S. PATENT DOCUMENTS

| 1,954,454 | 4/1934 | McFarland | 285/22 |
| 2,695,182 | 11/1954 | Folz | 285/138 |
| 4,121,858 | 10/1978 | Schulz | 285/133 R |

FOREIGN PATENT DOCUMENTS

| 1525925 | 9/1966 | Fed. Rep. of Germany . |
| 2757219 | 7/1979 | Fed. Rep. of Germany ........ 285/41 |
| 2010434 | 6/1979 | United Kingdom ................ 285/138 |

Primary Examiner—Dave W. Arola
Attorney, Agent, or Firm—Michael L. Dunn; Howard M. Ellis

[57] ABSTRACT

The invention relates to a connector for joining the tubular jacket of a heated or cooled pipe to the flange which is welded to the end of a pipe section and has, arranged on a pitch circle, bores for passing fixing bolts through and channels for the heating or cooling medium. The connector has a shape which widens from one of its ends having a circular cross-section to the other end having a contour which is serrated like a star or is wavy.

3 Claims, 6 Drawing Figures

CONNECTOR FOR HEATED PIPES

The invention relates to a connector for joining the tubular jacket of a heated or cooled pipe to the flange which is welded to the end of a pipe section and has, arranged on a pitch circle, bores for passing fixing bolts through and channels for the heating or cooling medium.

It is known, for example from U.S. Pat. No. 1,497,652, to form the passage channel for the heating or cooling medium, leading from the annular space of a jacket-heated or -cooled pipe section into the adjoining section, by means of channels located in the pitch circle of the fixing bolts and having axial and radial sections. Due to the repeated deflection of the medium at right angles, a high pressure drop results when heating or cooling medium passes from one pipe section into the adjoining section.

It is now the object of the present invention to provide a connector of the generic type, which, coupled with simple and inexpensive manufacture, causes the smallest possible pressure drop when the heating or cooling medium flows through the flanged connection. The invention is also intended to provide scope for inlet and outlet connections for heating or cooling medium into and out of the annular jacket space.

According to the invention, this object is achieved by a connector having the features characterised in the claims.

The connector according to the invention can be made, simply and inexpensively in one working step, from a single pipe section by pressing in a die of a appropriate form. One end, having a wavy or serrated contour line, of the connector is welded to the flange and the other end with a circular contour is welded to the outer jacket of the pipe. Due to the quasi-conical transition from the channels for the heating or cooling medium in the flange to the annular jacket space of the pipe, the pressure drop which arises is very small. The serrated or wavy contour of the connector in the region of the flange also makes the fixing bolts readily accessible, which can be tightened and slackened without hindrance by the connector. Due to the larger heat transfer area formed by the connector on the flange, cooling or heating of the latter is improved.

The invention also provides good scope for inlet and outlet connections for heating or cooling medium. When, after flowing through a certain pipe length, the heating medium has cooled down and may be condensed, or the cooling medium has been warmed up, it must be withdrawn from the heated or cooled pipe, and new medium must be fed in. As in the past, this takes place in the zone of a flanged connection. According to one embodiment, the branches for the inlet and outlet of the medium are inserted into the connector, a welded-in annular disc forming two mutually separate annular spaces, so that short-circuiting can be avoided and the new medium fed in cannot pass directly into the outlet branch. It is also possible to provide one or more channels in each of the flange rings connected to one another, through which channels the medium is radially fed in from or discharged to the outside.

When passing medium in the axial direction through the flanged connection from one pipe section into an adjoining section and also when feeding and discharging medium at certain points of a heated or cooled pipe, the connector according to the invention meets the requirement of a greatly reduced pressure drop during the flow through the zone of the flanged connection.

Figure 2:
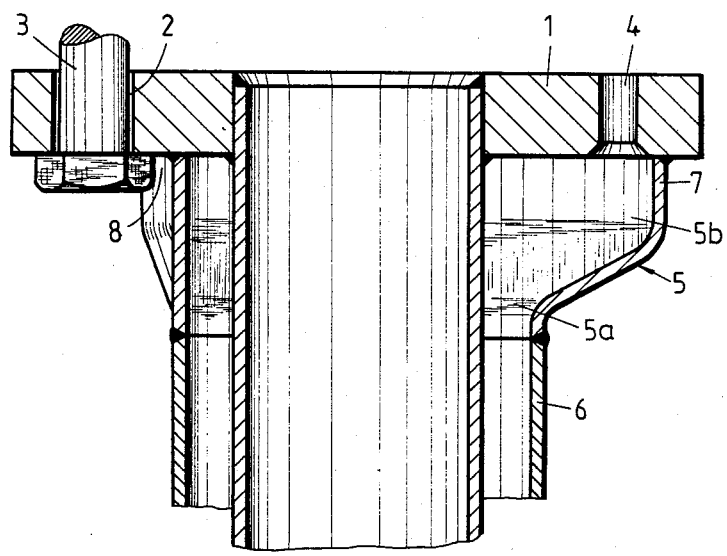
Figure 3:
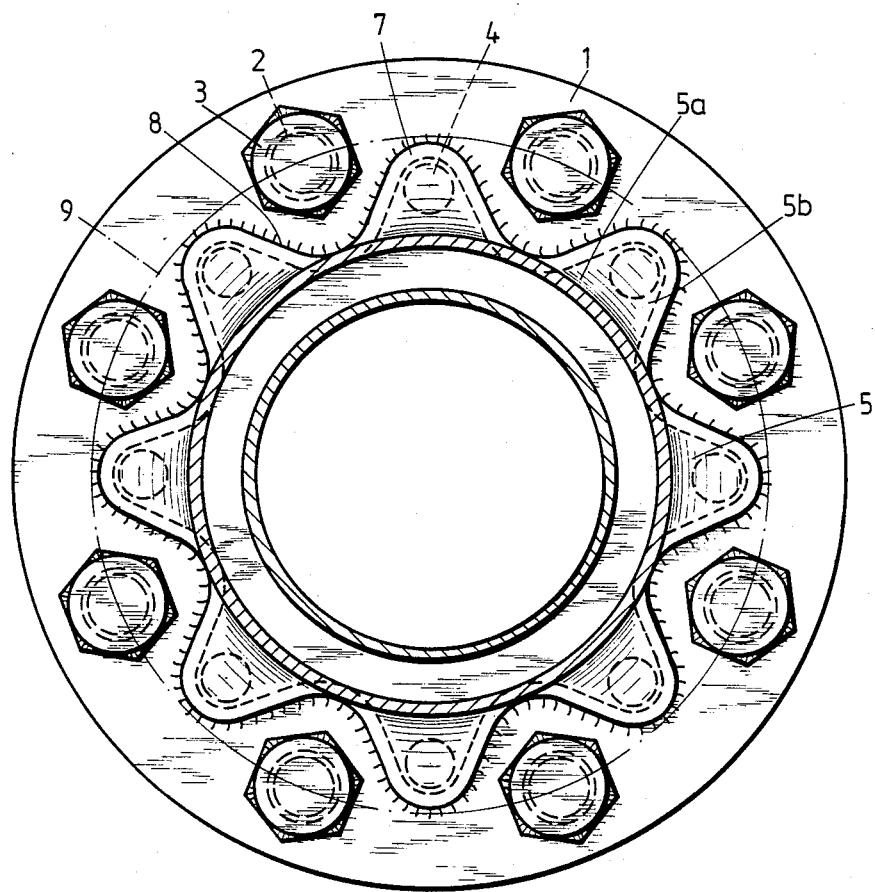
Figure 4:
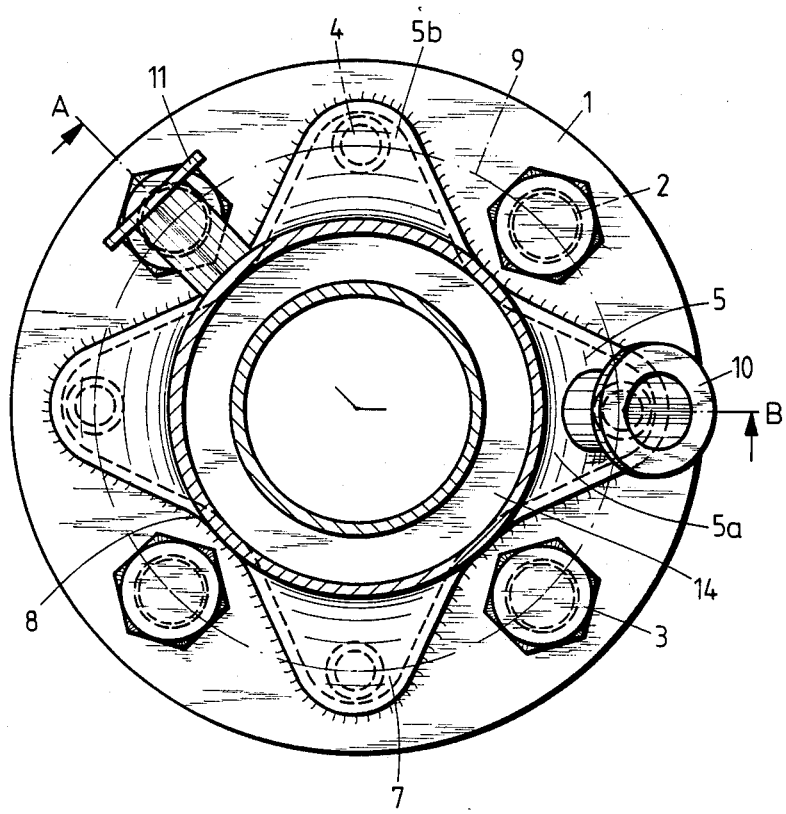
Figure 5:
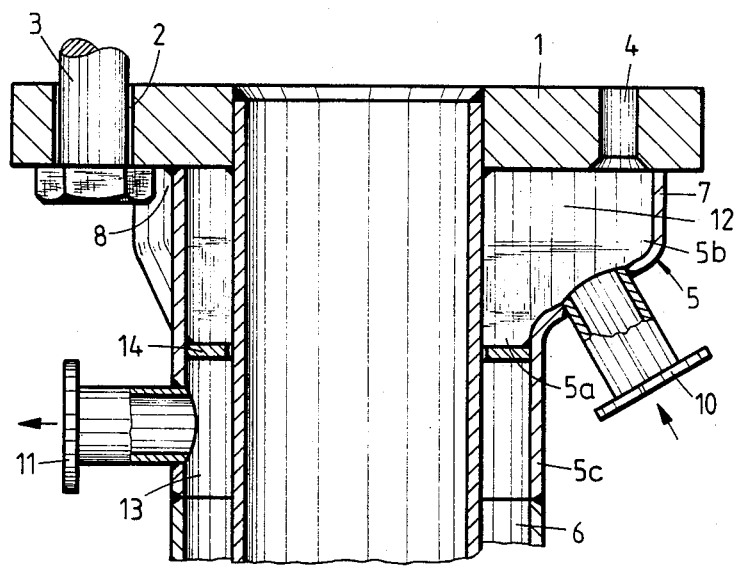
Figure 6:
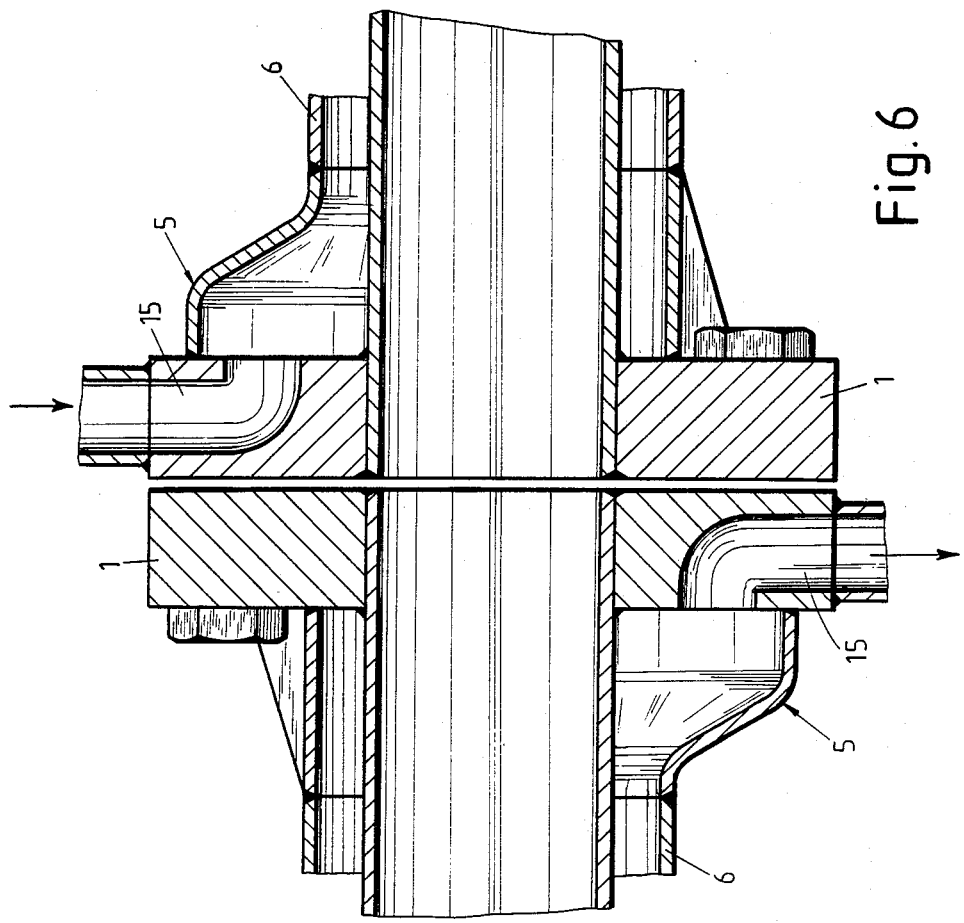

Illustrative embodiments of the connector according to the invention are represented in the drawing in which:

FIG. 1 shows a view of the connector which is welded to the rear face of a flange, opposite the sealing face, FIG. 2 shows the associated side view, FIG. 3 shows a view as in FIG. 1, but with a larger number of bores and fixing bolts in the flange, FIG. 4 shows a view as in FIG. 1, but with connecting branches for the feed and discharge of heating medium, FIG. 5 shows the associated section along the line A-B, and FIG. 6 shows a longitudinal section through a flanged connection with separate feed and discharge of the heating or cooling medium through channels in the flanges, radially inwards and outwards respectively.

In the embodiment according to FIGS. 1 and 2, the flange 1 has four bores 2 for passing fixing bolts 3 through and four axial continuous channels 4 for the passage of heating or cooling medium. The channels 4 can be bores, slots or square orifices.

The connector 5 according to the invention, leading from the flange 1 to the heating jacket 6, has a circular contour at its end 5a facing the heating jacket 6, and a cross-section corresponding to that of the heating jacket 6. Its other end 5b, adjoining the flange 1, is wavy in the form of a star, as can best be seen from FIG. 1. The star-shaped projections 7 of the connector 5 pass around the channels 4 for the passage of heating or cooling medium, so that the latter are closed off from the outside, whilst the indentations 8 are placed in such a way that the fixing bolts 3 are readily accessible.

Whilst the channels 4 in the illustrative embodiment according to FIGS. 1 and 2 are located in the pitch circle 9 of the fixing bolts 3, they are in the vicinity of this pitch circle 9 in the case of the illustrative embodiment according to FIG. 3. Corresponding to the larger number of bores 2 and channels 4, the connector 5 in the embodiment according to FIG. 3 has a larger number of projections 7 and indentations 8 than in the case of the embodiment according to FIGS. 1 and 2.

As a modification of the wavy design shown in FIGS. 1 to 3, the connector 5 can also have a serrated contour at its end 5b, but the wavy contour form is more advantageous with respect to manufacture and stability.

In the embodiment shown in FIGS. 4 and 5, one or more branches 10, 11, distributed over the circumference, for the feed or discharge of heating or cooling medium are provided on the connector 5 in each case. The branch 10 for the inlet of medium is here preferably arranged with its axis obliquely relative to the axis of the pipe, facing the rear face of the flange. As a result, there is no sharp deflection of the medium fed in, when the latter flows through the channels 4 in the flange 1. The branch 11 for the discharge of medium, however, can be inserted radially into the connector 5. On the installed pipe, it is advantageously placed at the bottom, so that condensate can drain automatically by gravity.

To avoid short-circuiting, that is to say to prevent the newly fed medium flowing in through the branch 10 from flowing out through the outer branch 11, an annular disc 14 extending right up to the inner pipe is welded to the connector 5 approximately in the longitudinal centre thereof. As a result, two spaces 12, 13 separate from one another are formed in the connector 5. The newly fed medium flows into the space 12, and the medium flowing out passes from the space 13 into the branch 11.

As FIG. 5 shows, a pipe section 5c corresponding to the cross-section of the outer pipe 6 of the pipe jacket heating can be formed integrally on the quasiconical connector 5. The annular disc 14 is then preferably welded to the junction of the connector 5 and the pipe section 5c.

In the illustrative embodiment shown in FIG. 6, the channels 15 for the inlet or outlet of heating or cooling medium from or to the outside respectively are formed in the flange rings 1. In this embodiment also, the connector 5 according to the invention prevents a sharp flow deflection entailing a pressure drop.

I claim:

1. In a connector for use with a pipeline section, flange and tubular jacket surrounding the pipeline section with the pipeline section having one end to which the flange is affixed, the flange having bores therethrough for passing fixing bolts and at least three channels for heating and cooling medium to pass through arranged on the same pitch circle, and the tubular jacket surrounding the pipeline section to allow passage of the heating or cooling medium, therebetween the improvement comprising an outer boundary wall of the connector having a first end of circular outline adapted for connection to the tubular jacket, the outer boundry wall having a second end adapted for connection to the flange, said second end formed with a star-shaped, serrated or wavy outline providing circumferentially spaced recesses and projections overlying said channels in said outer boundary wall adjacent to the fixing bolt bores of the flange, access to the fixing bolts the outer boundary wall viewed in radial and axial section being substantially conical shaped.

2. The connector according to claim 1, further comprising an outwardly projecting inlet, an outwardly projecting outlet and an annular disc positioned between the outer boundary wall and the pipeline section defining separate spaces within the connector into which the inlet and outlet respectively open, the axis of the projecting inlet being oblique to the axis of the connector and directed towards the second end joined to the flange.

3. The connector according to claim 1 formed from a single piece of pipe of the same diameter as the first end.

* * * * *